United States Patent
Gozzi (10) Patent No.: US 6,966,460 B2
(45) Date of Patent: Nov. 22, 2005

(54) DEVICE FOR CONTAINING AND SUPPLYING LOOSE MATERIAL

(75) Inventor: Franco Gozzi, Modena (IT)

(73) Assignee: System S.p.A., Fiorano Modenese (IT)

( * ) Notice: Subject to any disclaimer, the term of this patent is extended or adjusted under 35 U.S.C. 154(b) by 0 days.

(21) Appl. No.: 10/511,346

(22) PCT Filed: Sep. 30, 2002

(86) PCT No.: PCT/IT02/00622

§ 371 (c)(1),
(2), (4) Date: Oct. 15, 2004

(87) PCT Pub. No.: WO2004/028769

PCT Pub. Date: Apr. 8, 2004

(65) Prior Publication Data

US 2005/0145652 A1    Jul. 7, 2005

(51) Int. Cl.[7] ............................................. B67D 5/64

(52) U.S. Cl. ..................... 222/171; 222/557; 141/273

(58) Field of Search ............................. 222/171, 557, 222/560; 141/273

(56) References Cited

U.S. PATENT DOCUMENTS

| | | | | |
|---|---|---|---|---|
| 4,678,342 A | * | 7/1987 | Dalman | 222/171 |
| 5,385,181 A | * | 1/1995 | Bhagwat et al. | 222/171 |
| 5,499,746 A | | 3/1996 | Berrebi et al. | |
| 5,809,384 A | * | 9/1998 | Johroku et al. | 222/171 |

FOREIGN PATENT DOCUMENTS

| | | |
|---|---|---|
| DE | 37 10 308 | 2/1988 |
| GB | 960491 | 6/1964 |

* cited by examiner

*Primary Examiner*—Philippe Derakshani
(74) *Attorney, Agent, or Firm*—Young & Thompson

(57) ABSTRACT

A device for containing and supplying loose materials, includes: a support frame (5); a rigid container (2) mounted on the support frame (5) and exhibiting at least one opening (3); elements (4) for opening or closing the at least one opening (3). The rigid container (2) is rotatably constrained to the support frame (5) and is rotated on the support frame (5) with rotating elements (11). The container (2) is mobile between at least a first position, in which the at least one opening (3) is located in an upper position for loading loose material into the container (2), and at least a second position, in which the at least one opening is located in a lower position for unloading the loose material from the container (2).

12 Claims, 6 Drawing Sheets

DEVICE FOR CONTAINING AND SUPPLYING LOOSE MATERIAL

TECHNICAL FIELD

The invention relates to the field of devices for containing and supplying loose materials.

The invention relates in particular to the containing and supplying of ceramic powders in machines for production of ceramic tiles, to which the present description will make reference without losing sight of more general applications of the invention.

BACKGROUND ART

As is known, ceramic tiles are obtained by pressing ceramic powders deposited in dies by special hoppers.

The ceramic powders are contained in large-capacity silos and are transported to the hoppers by connecting conveyor belts.

Plants of the above-mentioned type are suitable for large-series production in which large volumes of materials are used but only a few qualities of powder. The prior art also contains plants in which the powder storage is done using small deformable sacks. Although this solutions enables management of a greater number of types of powder, it exhibits some drawbacks connected with supplying the powders to the hoppers.

The sacks have to be lifted and opened at their bottoms in order to transfer the powders, by a lifting system able to place the powders in the hopper.

During this operation a part of the contents of the sack is lost, fouls the surrounding work environment and the operatives working there, and can be inhaled by the operatives, with damaging consequences to health.

In this situation, the technical solution provided by the present invention is to provide a device for containing and supplying loose materials which overcomes the cited drawbacks.

In particular, an aim of the present invention is to provide a device for containing and supplying loose materials which is also a container for storage of the powders as well as a hopper for supply thereof.

A further aim is to provide a device for containing and supplying loose materials which overcomes undesirable losses of the powders during the supply process. A further aim of the invention is to realise a device for containing and supplying loose materials which facilitates the powder-changing operations.

The technical aims as specified above are attained by a device for containing and supplying loose materials which has the characteristics as recited in one or more of the appended claims.

DISCLOSURE OF INVENTION

A non-limiting example of a preferred embodiment of the device will now be described, as illustrated in the accompanying figures of the drawings, in which.

With reference to the figures of the drawings, the device for containing and supplying loose materials of the invention is denoted by number 1.

The device 1 comprises a container 2 of known type, rigid and provided with an opening 3 for filling and emptying the container 2 with loose material, especially with ceramic powders destined for production of ceramic tiles.

For this purpose, the opening 3 is provided with special means 4 for opening or closing the opening 3.

As illustrated in the figures of the drawings, the container 2 advantageously exhibits an overall parellelepiped shape, preferably cubic.

The container 2 is rotatably constrained to a support frame 5 and can rotate about a rotation axis x.

In particular, the support frame 5 exhibits a base 6 which is formed by two beams 7, reciprocally distanced, from which two uprights extend vertically. Each upright, which uprights in the illustrated embodiment have the form of a rectangular sheet 8, rigidly connects the two beams 7. The sheets 8 face one another and are side-by-side with the rigid container 2 which has two faces 9, parallel to the sheets 8. Consequently the rotation axis x is perpendicular to the sheets 8 and the faces 9 of the container 2.

Advantageously, the opening 3 extends at least partially along a corner 10 of the container 2; this corner 10 with the opening shall hereinafter be termed the access corner 10a.

At least the access corner 10a is a rounded corner, though in order to avoid loose material collecting following rotation, it is preferred that all the corners 10 parallel to the rotation axis x be rounded.

Preferably the container 2 exhibits a plurality of openings 3 reciprocally aligned along the access corner 10a.

Consequently, in the illustrated embodiment, the opening 3 or the plurality of openings 3 extend parallel to the rotation axis x of the container 2.

The device 1 further exhibits special means for rotation 11 which are operatively active between the container 2 and the support frame 5.

In more detail, the means for rotation 11 are defined by a crown wheel 12 solidly constrained to the container 2, and coaxially located with respect to the axis x of the container 2. The crown wheel 12 is predisposed to mesh with a cogged pinion 13 which is activated by means of a hollow shaft 19 driven by a motor 14 which is solidly constrained to a frame of an external support 50 on which the support frame 5 can be housed.

As can be seen from the figures, the cogged crown wheel 12 is mounted on a face 9 of the container 2 associated to a sheet 8.

The crown wheel 12 is circular and has cogs on an external perimeter 12a thereof. An internal perimeter 12b of the crown wheel 12 is smooth and associated to guide wheels 15 mounted idle on the sheet 8.

Similarly, the face 9 of the container 2 which is opposite the face on which the crown wheel 12 is mounted bears an auxiliary circular crown wheel 16, associated to a sheet 8 by identical guide wheels 15.

In a further embodiment, not illustrated, of the invention, the auxiliary crown wheel 16 exhibits a plurality of cogs at an external perimeter thereof, and the means for rotating 11 are symmetrically exhibited on both sheets 8 of the device 1.

The means for rotating 11 enable movement of the container 2 from at least one first position, in which the opening 3 or plurality of openings 3 of the container 2 are located in an upper position, in order to load the loose material, and at least a second position, in which the opening 3 or plurality of openings are located in a lower position, for unloading the loose material from the container 2.

In the lower position, the opening 3 is located between the beams 7 and the material is directly supplied to an auxiliary hopper T.

Further, the motor 14 enables the container 2 to be rotated continuously to mix the loose material contained therein before the supply stage.

Advantageously special means for movement 17 can move the pinion 13 between an enmeshed position with the crown wheel 12, in which the motor 14 causes rotation of the container 2, and an unmeshed position with the crown wheel 12, in which the container 2 is stationary.

The means for movement 17 of the pinion 13 comprise a support plate 21 which is coupled in rotation with a hollow shaft 19 and at least two actuators 22 arranged with longitudinal axes thereof parallel to a motion direction of the cogged pinion 13 and connected at an end to the external support frame 50, and at another end to the plate 21. The actuators 22 translate the plate 21 which then longitudinally moves the hollow shaft 19 on which the cogged pinion 13 is keyed.

When the pinion 13 is in a disengaged position, the container 2 is stopped by means for blocking 18 which act on the crown wheel 12. In more detail, with special reference to FIG. 5, the pinion 13 is keyed on the hollow shaft 19, which is internally grooved.

Figure 5:
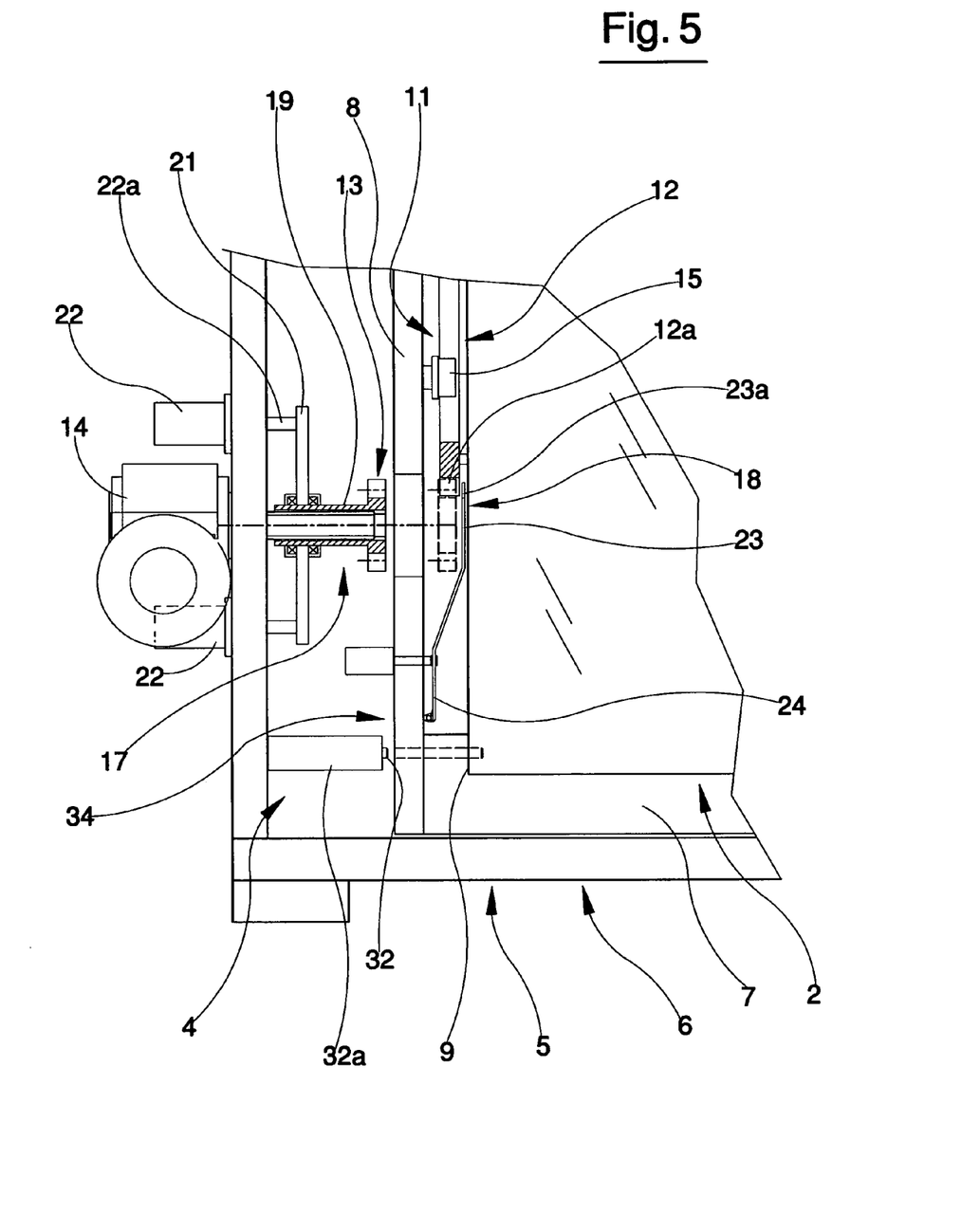
FIG. 5 is an enlarged-scale view of a part of FIG. 3, in section, according to a vertical plane containing the axis x.

A shaft 20 of the motor 14 is slidably inserted in the cavity of the hollow shaft 19. The motor 14 shaft 20 exhibits grooves on an external surface thereof which are complementary to the grooves of the hollow shaft 19, in order to enable transmission of torque from the motor 14 to the pinion 13.

The hollow shaft 19 is rotatably coupled with the support plate 21, which is moved towards the container 2, towards the enmeshing position of the pinion 13, or away from the container 2, towards the disengaged pinion 13 position, by the actuators 22.

In the illustrated embodiment, the actuators 22 are two pneumatic cylinders mounted between the external support frame 50 and the sheet 8 and are provided with axially sliding pivots 22a connected at and end thereof to the support plate 21. Also associated to the external support frame 50 are the means for blocking 18 the container 2.

In particular, the means for blocking 18 comprise a cogged plate 23 which is mobile between an enmeshed position with the crown wheel 12, which position corresponds with the disengaged position of the pinion 13, and a disengaged position from the crown wheel 12, which corresponds to an enmeshed position of the pinion 13.

As can be seen in FIG. 5, the cogged plate 23 is side-by-side with the pinion 13 and mounted solidly on the support frame 5 by and end 24 thereof.

The cogged plate 23 moves away from or towards the crown wheel 12 together with the pinion 13, so that the crown wheel 12 interferes either with the pinion 13 or the cogged plate 23.

When the cogs 23a of the cogged plate 23 are enmeshed with the crown wheel 12, the rotary motion of the container 2 is blocked.

The blocking of the rotation is done during the powder loading and unloading stages of the container 2 during which the opening 3 or plurality of openings are opened by means 4 specially dedicated to this function.

In more detail the means 4 for opening and closing the opening 3 comprise a small plate 25 mounted internally of the container 2, which small plate 25 is mobile between a closed position, in which the small plate 25 lies in a position in which it closes the opening 3 or plurality of openings, and an open position, in which the small plate 25 is displaced away from the opening 3.

The small plate 25 is moved by means dedicated thereto.

In particular, the small plate 25 is mounted on a support frame 27 constrained to a shaft 28.

The shaft 28 is mounted in the container 2 at the position of the access corner 10a and parallel thereto.

The shaft 28 is rotatable about a longitudinal axis Y thereof and a rotation thereof determines a displacement of the small plate 25 solidly constrained thereto between the open position and the closed position.

The rotation of the shaft 28 is obtained by a mechanism 29 comprising a fork 30 mounted transversally to the shaft 28 on an end 28a of the shaft 28 itself which is external of the container 2 and which is predisposed to interact with two pivots 31 and 32.

The fork 30 interferes with the first pivot 31, which is mounted on the external support frame 50 at a position corresponding to the upper portion of the opening 3, or with the second pivot 32, which is mounted on the external support frame 50 at a position corresponding to the lower portion of the opening 3.

Figure 1:
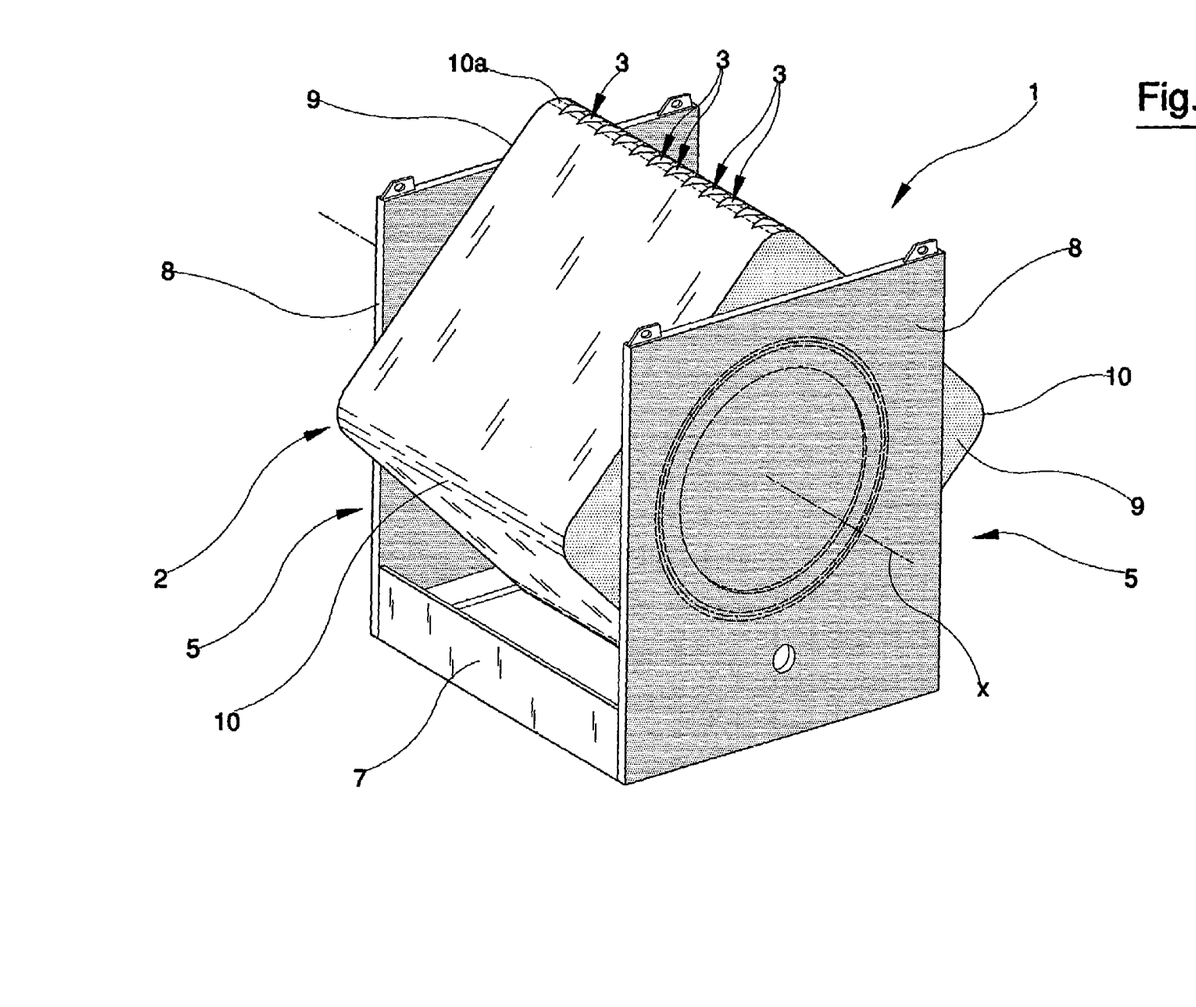
FIG. 1 is a perspective view of a device for containing and supplying loose materials according to the invention, in a first operative condition.
Figure 2:
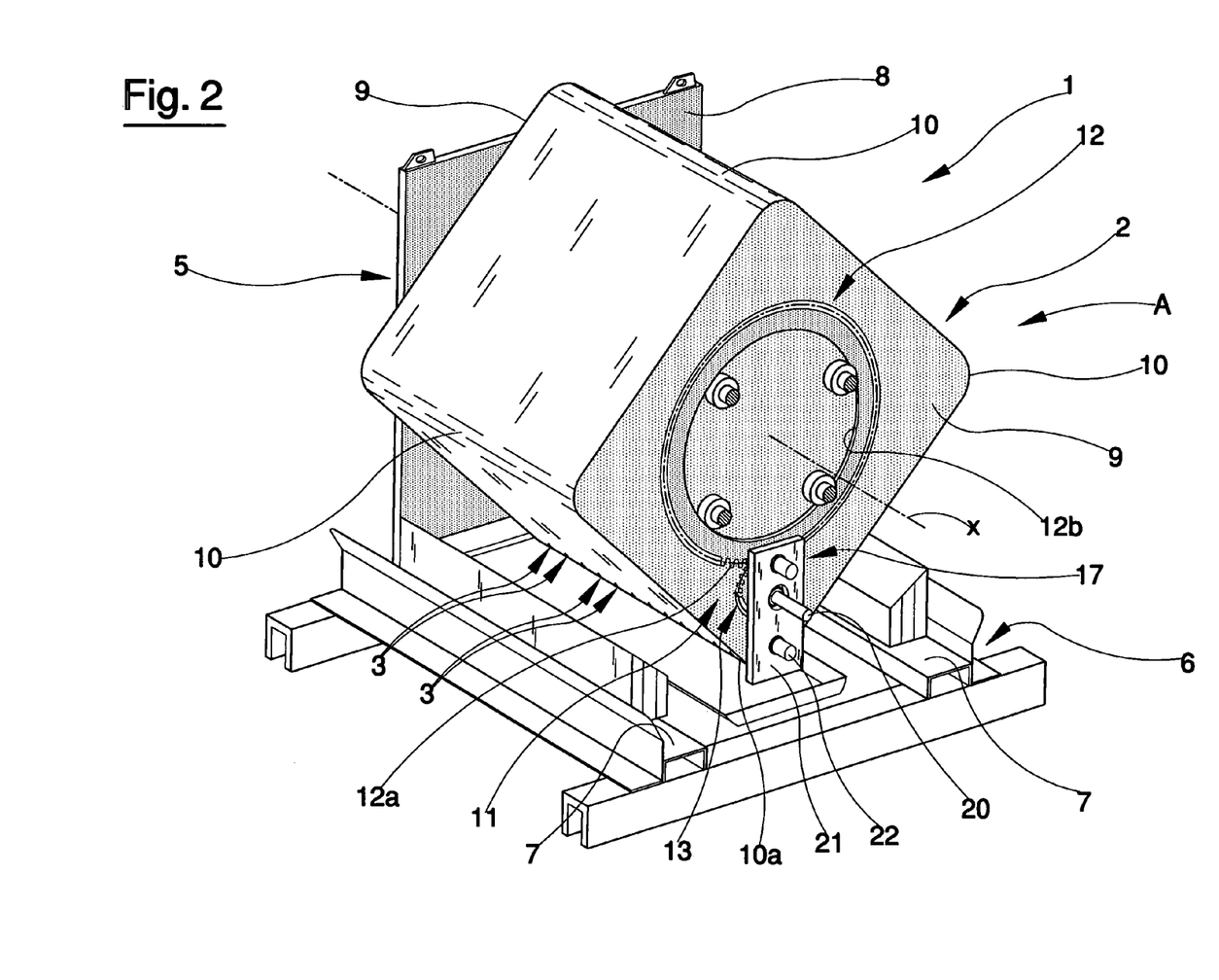
FIG. 2 is a perspective view of the device of FIG. 1, in a second operative condition, with some parts removed better to evidence others.
Figure 3:
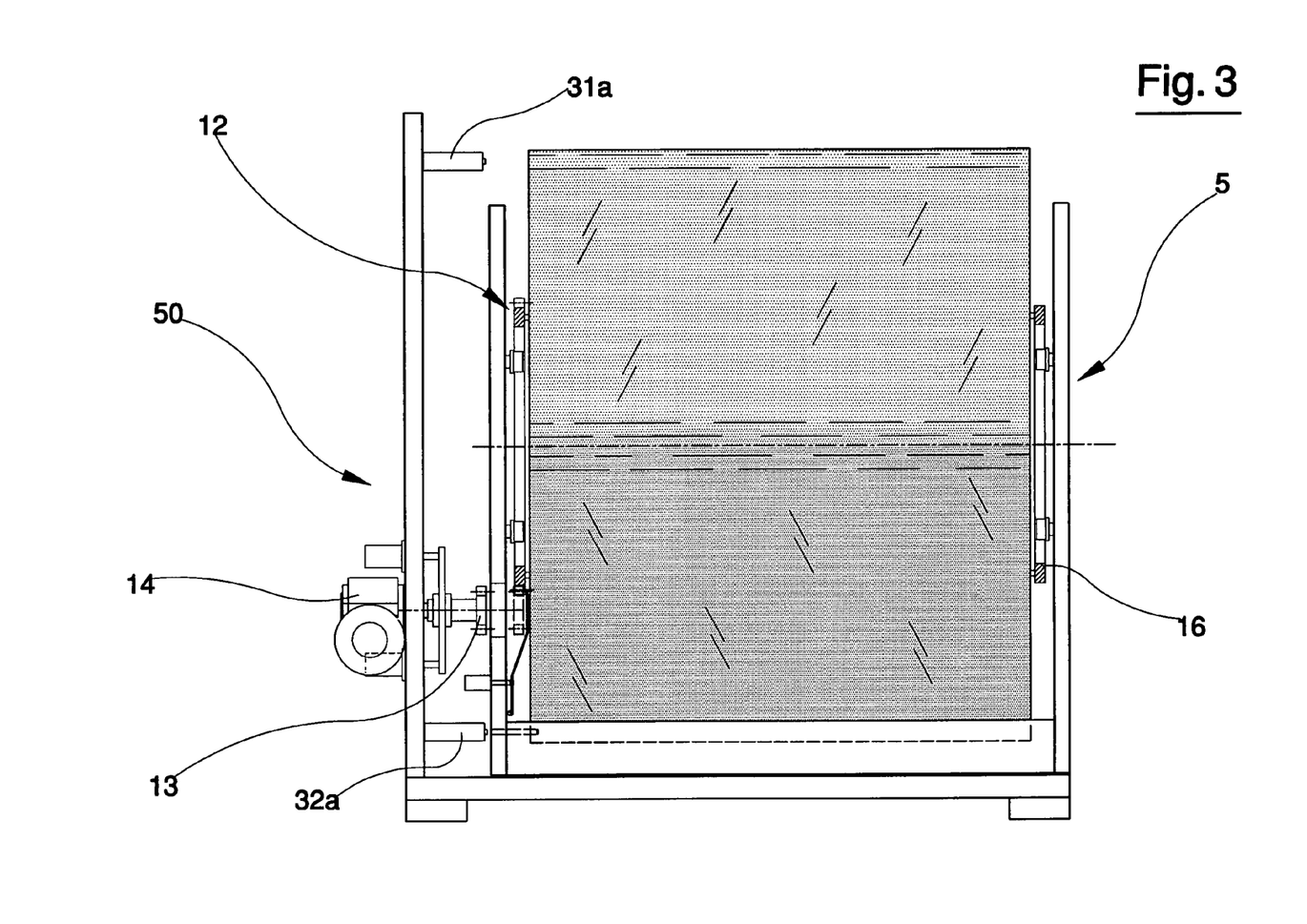
FIG. 3 is a lateral view of the device of FIG. 2.
Figure 4:
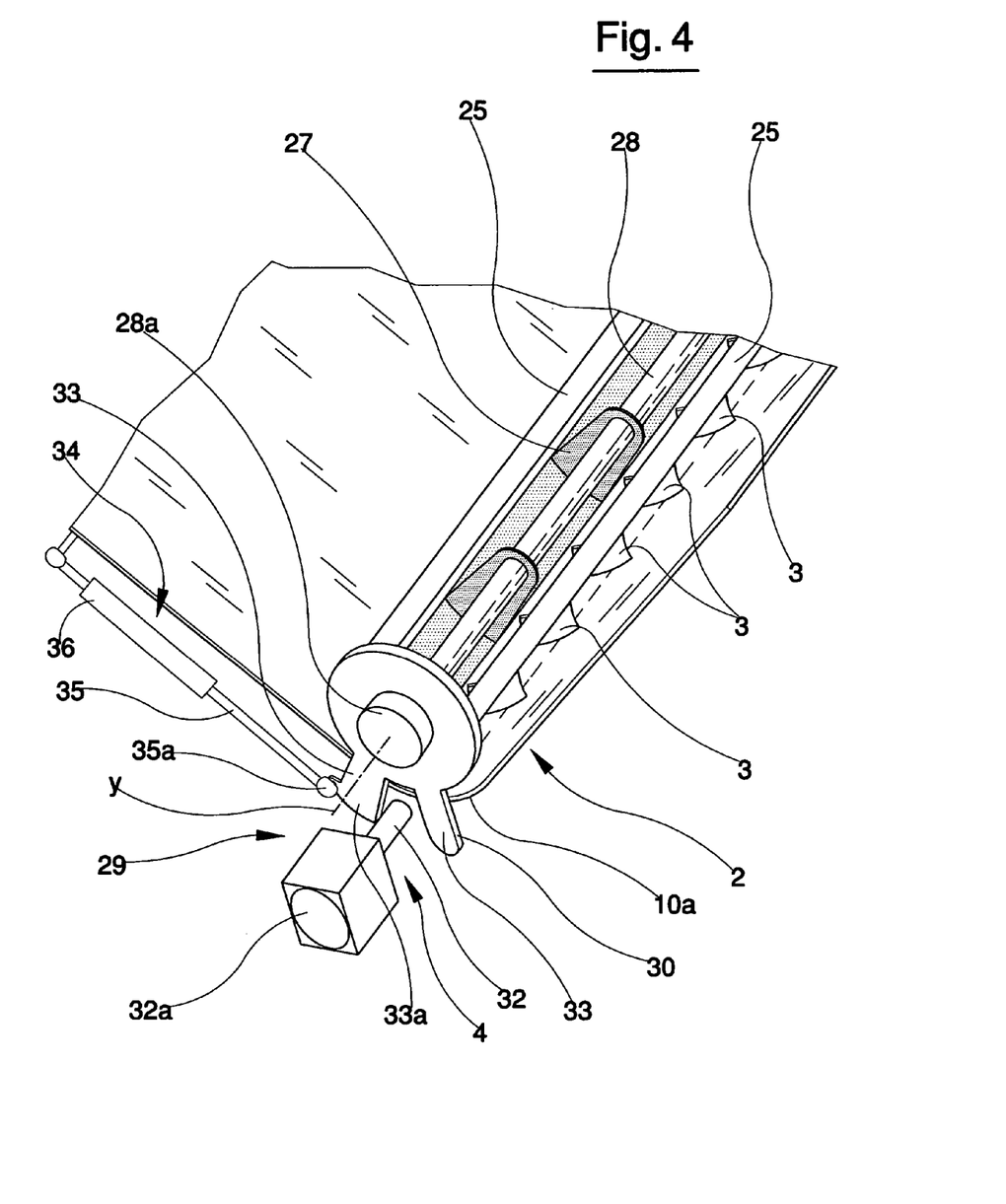
FIG. 4 is a sectioned enlarged-scale perspective view of a part of the device.

More in detail, as illustrated in FIGS. 3 and 4, the first pivot 31 is installed at a position corresponding to an upper portion 33 of the external support frame 50 and the second pivot 32 is installed at a position corresponding to a lower position 34 of the external support frame 50.

Both the first pivot 31 and the second pivot 32 are mobile between a distanced position from the container 2 and a close position to the container 2.

In the illustrated embodiment, the first and second pivots 31, 32, are inserted in respective pneumatic cylinders 31a, 32a.

In the close position, the pivots 31, 32 interfere with the fork 30, while the container 2 is still in rotation.

In particular, the pivots 31, 32, are controlled by a control panel, of known type and neither further described nor illustrated. The control panel causes the pivots 31, 32 to insert between the arms 33 of the fork 30. During the following rotation, the posterior arm 33a (posterior with respect to the advancement direction of the fork 30) contacts the pivot 31, 32 and rotates together with the shaft 28 with respect to the container 2, determining a displacement of the small plate 25 from the closed position to the open position.

Both pivots 31, 32 have the same function: if the opening 3 is located in the upper position, the fork 30 interacts with the first pivot 31, while if the opening is located in the lower position, the fork 30 interacts with the second pivot 32. During the rotation of the container 2, to displace the opening 3 between the upper and lower positions, or to mix the material in the container 2, the small plate 25 is kept in the closed position by elastic return means 34 operating on the shaft 28.

Figure 6:
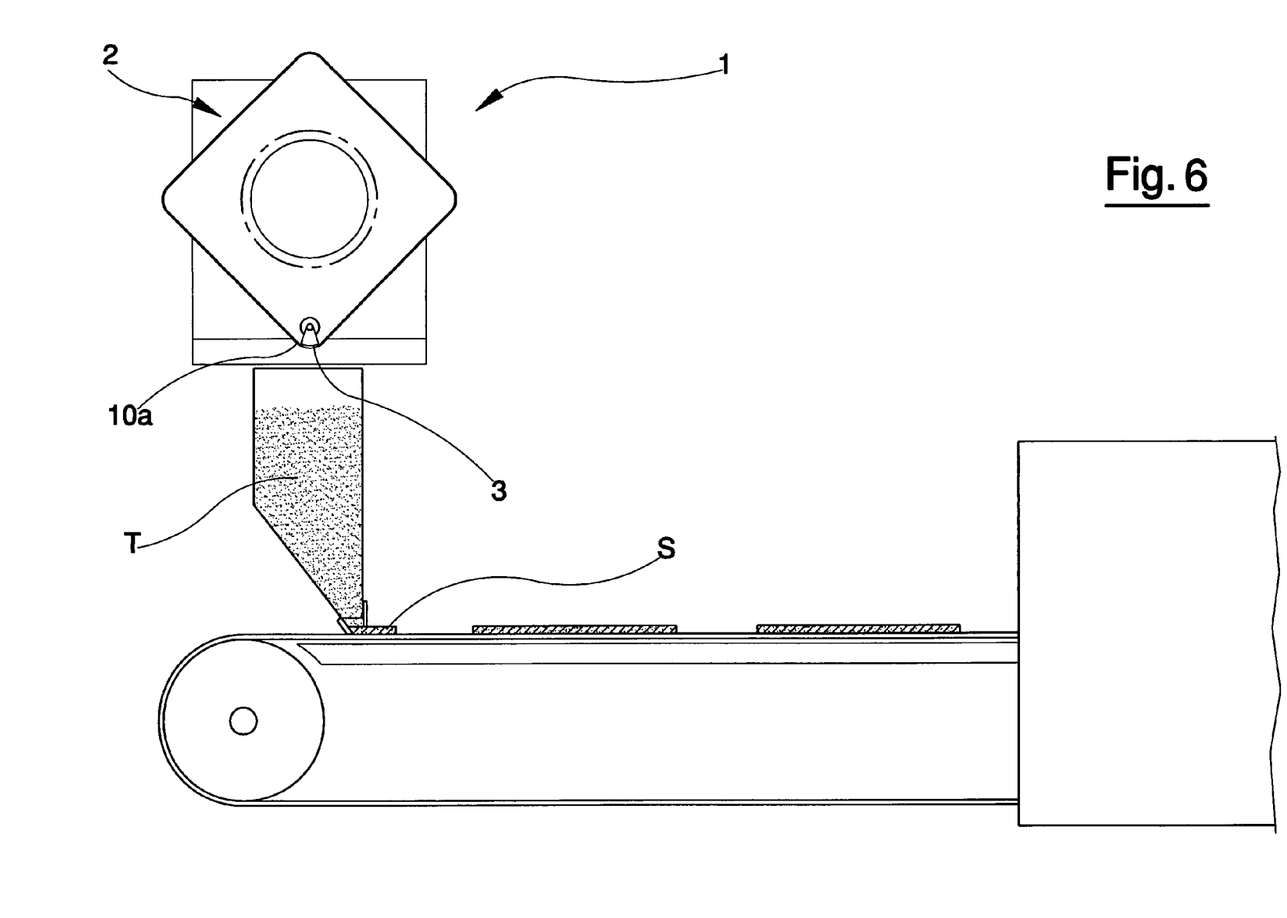
FIG. 6 is a schematic view of the invention applied to a plant for the production of ceramic tiles.

Preferably, as shown in FIG. 6, the elastic return means 34 are constituted by a rod 35 which is slidably inserted in a cylinder 36. The cylinder 36 is constrained to the container 2 while the external end 35a of the rod 35 is mounted on an arm 33 of the fork 30.

A spring element is located in the cylinder 36 in contact with the internal end of the rod 35, not illustrated, which keeps the rod 35 in a maximum-elongated configuration and pushes the fork 30 towards the closed position of the small plate 25. During the opening stage, the pivots 31, 32 act to contrast the elastic return means 34.

Following the above mostly structural description, there now follows a description of the operation of the device of the invention.

For loading the material in the container 2, the opening 3 is located in the upper position. Just before the opening 3 reaches the upper position, while the container 2 is still rotating, the control panel commands the first pivot 31 which moves from the distanced position (from the container 2) into the close position, between the arms 33 of the fork 30. The first pivot 31 enters into contact with the posterior arm 33a of the fork 30 and determines the displacement of the small plate 25, as described herein above.

At this stage the control panel stops the motor 14 and activates the actuators 22 which move the pinion 13 from the enmeshed position to the disengaged position from the crown wheel 12; and at the same time the cogged plate 23 is moved from its disengaged position to its meshed position with the crown wheel 12 to block the container 2.

Once the container 2 has been filled with the loose material, i.e. with the ceramic powders, the control panel moves the first pivot 31 out of the close position to the container 2 and into the distanced position, disengaging the fork 30. The elastic return means 34 have the function of keeping the small plate 25 in the closed position.

At this point, the whole device 1 is ready for transport into a storage area, or it can be directly installed on the auxiliary hopper T. Once installed, the actuators 22 move the pinion 13 and the cogged plate 23 in an opposite direction to above, and the motor 14, now mechanically connected to the crown wheel 12, can rotate the container 2.

The container 2 can be brought directly towards the material unloading position or it can make several revolutions about the rotation axis x, to mix the material before supplying it to the auxiliary hopper T.

During the discharge or supplying stages, just before reaching the lower position, while the container 2 is still rotating, the control panel commands the second pivot 32 to move from the distanced position from the container 2, between the arms 33 of the fork 30. The second pivot 32 enters into contact with the posterior arm 33 of the fork and determines the movement of the small plate 25, as above described for the first pivot 31.

In this position too the control panel stops the motor 14 and activates the actuators 22 which displace the pinion 13 and the cogged plate 23 to block the container 2.

During this stage, the container 2 functions as a hopper since the material slides on the internal inclined walls of the container 2 and exits from the opening 3, to be deposited in the hopper T.

The invention offers important advantages.

First of all, it is worthy of note that the device 1 of the invention can function both as a container for storage purposes and as a hopper for supply, as well as a mixer, thus obviating the need for using several distinct devices, each dedicated to a particular function.

Further, the long and narrow opening of the device 1 enables the dies of the tile presses to be supplied directly.

A further observation is that the device 1 of the present invention guarantees that the work environment is not fouled by the powders, as undesired escape of material during the supply operations is avoided. The special opening and closing structure ensures that the container 2 remains hermetically sealed.

A final observation is that the device 1 of the invention facilitates the powder-changing operations, given the high level of automation it achieves.

What is claimed is:

1. A device for containing and supplying loose materials, comprising:
   a support frame (5);
   a rigid container (2) mounted on the support frame (5) and exhibiting at least one opening (3);
   means (4) for opening or closing the at least one opening (3);
   a device exhibiting means (11) for rotating the container (2) on the support frame (5) about a rotation axis (x) thereof; the container (2) being rotatably constrained to the support frame (5) and being mobile between at least a first position, in which the at least one opening (3) is located in an upper position for loading loose material into the container (2), and at least a second position, in which the at least one opening is located in a lower position for unloading the loose material from the container (2) charaterized in that the container (2) exhibits a parellelepiped shape with rounded corners and wherein the at least one opening (3) extends at least partially along an access corner (10a) of the rounded corners (10) of the container (2) and is parallel to the rotation axis (x) of the container (2).

2. The device of claim 1, wherein the container (2) exhibits a cubic shape.

3. The device of claim 1, comprising a plurality of openings (3) which are reciprocally aligned along the access corner (10a) of the container (2).

4. The device of claim 1, wherein the means for rotating (11) comprise:
   a cogged crown wheel (12) which is solidly constrained to the container (2) and which is coaxially arranged with respect to the rotation axis (x), the crown wheel (12) being predisposed to enmesh with a cogged pinion (13) which is activated by means of a hollow shaft (19) by a motor (14) which is solidly constrained on an external support frame (50) on which the support frame (5) can be housed.

5. The device of claim 4, comprising means for moving (17) the pinion (13) from an enmeshed position with the crown wheel (12), in which enmeshed position the motor (14) causes the container (2) to rotate, and a disengaged position from the crown wheel (12), in which the container (2) is stationary.

6. The device of claim 5, wherein the means for moving (17) the pinion (13) comprise:
   a support plate (21) rotatingly coupled with the hollow shaft (19);
   at least two actuators (22) having longitudinal axes which are parallel to a motion direction of the pinion (13), connected at an end thereof to the external support frame (50) and at another end thereof to the support plate (21).

7. The device of claim 6, comprising means for blocking (18) the crown wheel (12).

8. The device of claim 7, wherein the means for blocking (18) the crown wheel (12) comprise a cogged plate (23) associated to the external support frame (50) and mobile between an enmeshed position with the crown wheel (12) corresponding to a disengaged position with the pinion (13), and a disengaged position with the crown wheel (12), corresponding to an enmeshed position with the pinion (13).

9. The device of claim 1, wherein a means (4) for opening or closing the at least one opening (3) comprise:

a small plate (25) mounted internally of the container (2) and mobile between a closed position, in which the small plate (25) closes the at least one opening (3), and an open position, in which the small plate (25) is displaced away from the at least one opening (3); and means for moving the small plate (25).

10. The device of claim 9, wherein the means for moving the small plate (25) comprise:

a shaft (28) mounted in the container (2) at the access corner (10a) thereof and parallel to the access corner (10a); the small plate (25) being solidly constrained to the shaft (28);

the shaft (28) being rotatable about a longitudinal axis (Y) thereof in order to displace the small plate (25) between the open position and the closed position;

a mechanism (29) for rotating the shaft (28).

11. The device of claim 10, wherein the mechanism (29) for rotating the shaft (28) comprises:

a fork (30) mounted transversally to the shaft (28) and an end (28a) of the shaft (28) which end (28a) is external of the container (2), the fork (30) being predisposed to interact with a first pivot (31) and a second pivot (32);

the first pivot (31) being mounted on the external support frame (50) at a position corresponding to an upper position of the at least one opening (3); the first pivot (31) being mobile between a distanced position from the container (2) and a close position to the container (2), and interfering with the fork (30) when the at least one opening (3) is located in the upper position and determining a displacement of the small plate (25) from the closed position to the open position;

the second pivot (32) being mounted on the external support frame (50) at a lower position of the at least one opening (3); the second pivot (32) being mobile between a position in which it is distanced from the container (2) and a position in which it is close to the container (2), and interfering with the fork (30) when the at least one opening (3) is located in the lower position and determining a displacement of the small plate (25) from the closed position to the open position.

12. The device of claim 10, comprising elastic return means (34) which act upon the shaft (28) to keep the small plate (25) in the closed position thereof.

* * * * *